United States Patent [19]

Simon

[11] Patent Number: 5,396,832
[45] Date of Patent: Mar. 14, 1995

[54] FRYER PROTECTIVE COVERING

[76] Inventor: Sidney Simon, 31 Croft Ct., Pittsburgh, Pa. 15235

[21] Appl. No.: 584,137

[22] Filed: Sep. 18, 1990

[51] Int. Cl.[6] ............................................. A47J 37/12
[52] U.S. Cl. ........................................ 99/337; 99/403
[58] Field of Search ................. 99/330, 331, 337, 403, 99/408; 220/352; 312/7.1, 7.2, 223, 293

[56] References Cited

U.S. PATENT DOCUMENTS

| 2,304,140 | 12/1942 | Bergholm | 99/331 |
| 3,911,250 | 10/1975 | Price | 99/337 |
| 4,068,571 | 1/1978 | Cunningham | 99/408 |

FOREIGN PATENT DOCUMENTS 0623123  5/1981  Switzerland ........................ 99/337

Primary Examiner—David A. Scherbel
Assistant Examiner—Reginald L. Alexander
Attorney, Agent, or Firm—Hymen Diamond

[57] ABSTRACT

A fryer having a readily mountable or demountable protective cover for preventing the deposit of spray on the mechanisms for controlling the heater. The mechanisms are mounted on a control panel on the front of the cabinet of the fryer. The protective cover is a hood-like integral structure including a channel member covering the front and sides of the control panel and a top for covering the top of the panel. The top has a lip which effectuates the protective function by the cover. The protective cover has slots for engaging slideably the upper edges of the side walls of the cabinet extending from the panel to suspend the protective cover removably from the cabinet.

10 Claims, 5 Drawing Sheets

FRYER PROTECTIVE COVERING

BACKGROUND OF THE INVENTION

This invention relates to fryers and it has particular relationship to fryers in "fast-food" restaurants in whose operation the frying of the food which is served generates spray.

This invention has unique application and is described herein as integrated fryers for so-called "hot dog" shops. It is to be understood that the adaptation of this invention to like facilities for other purposes is within the scope of equivalents thereof. A typical fryer for a "hot-dog" shop includes a cabinet having a top compartment in which oil is deposited. The oil is heated to a high temperature by a heater including heating tubes immersed in the oil. A gas flame generated below the heater tubes penetrates into the heater tubes. The heat generated may be as high as 110,000 to 120,000 BTU. The tubes are sealed against penetration of oil or spray to opposite walls of the cabinet. Typically, a basket whose walls are screens is suspended from the cabinet over the oil. There is also typically a screen in or above the oil pool on which solid food, weiners or hamburgers, may be fried. The fryer has a front control panel on which mechanisms for controlling the heating are mounted. Typically, these mechanisms include an on-off switch, indicator lights and one or more dials operated by a knob or knobs for controlling the temperature. These mechanisms operate electrically and are connected to the heaters by wires.

Fryers in accordance with the teaching of the prior art have demanded excessive and unusual attention and maintenance. This demand has resulted in a substantial increase in the cost of maintenance. In addition, fryers requiring maintenance are out of service during the intervals when they are being repaired, which results in delay in serving the customers. At times a fire is ignited within the fryers with attendant hazzard to the facilities where the fryers are used and the personnel.

It is an object of this invention to overcome the disadvantages and drawbacks of the prior art and to provide a fryer which shall not demand excessive or unusual maintenance and in whose use fires shall not be ignited.

SUMMARY OF THE INVENTION

This invention arises from the discovery that the cause of the excessive and unusual maintenance is the deposit of spray on the control panel of the fryer from the cooking operation. The liquid resulting from the spray seeps into the regions where the wires from the heaters are connected to the control mechanisms on the front panel. The liquid attacks the wire Junctions and, in addition, penetrates between the wires and the terminals to which the wires are connected, insulating the wires from the terminals. In addition, liquid introduces obstructions into the moving parts of the mechanism deteriorating their operation. Another discovery which is of notable importance is that the fires are caused by the ignition of the spray which penetrates into the space behind the panel. Such fires devastate the wiring in this space and result in the necessity of completely replacing the panel.

In accordance with this invention, there is provided a fryer with a protective cover for its control panel. The protective cover has, generally, the structure of a hood and includes a member for preventing the deposit of spray from the front, side or top of the panel. The protective cover also has slotted members for slideably engaging the upper edges of the side walls of the cabinet extending from the panel so that the protective cover can be readily mounted on the cabinet in protective relationship to the panel or readily removed from the cabinet to permit setting of the control mechanism. The protective cover also protects the controls, thermostat, signal lights, switches on the panel from being bumped and broken displaced. This is an important feature in a fast-food restaurant where there is only a narrow space between the fryers and the counter where the food is delivered.

Structurally, the protective cover includes a member in the shape of a channel, i.e., of U-shaped transverse cross section. The web of the channel prevents impingement of spray on the front surface of the panel and the flanges prevent the impingement of spray on the sides of the cabinet. A housing extends from the top of the channel. This housing includes a top plate terminating in a lip intermediate the ends of the flanges of the channel. The top plate protects the top of the panel from impingement of spray and the lip effectuates the protective function of the cover the cabinet. Slots extend from the top plate and lip on both sides. These slots are engaged with the upper edges of the lateral sides of the cabinet which extend from the panel along the length of the cabinet and permit the protective cover to be readily mounted on the cabinet, or readily removed from the cabinet.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF EMBODIMENT

Figure 1:
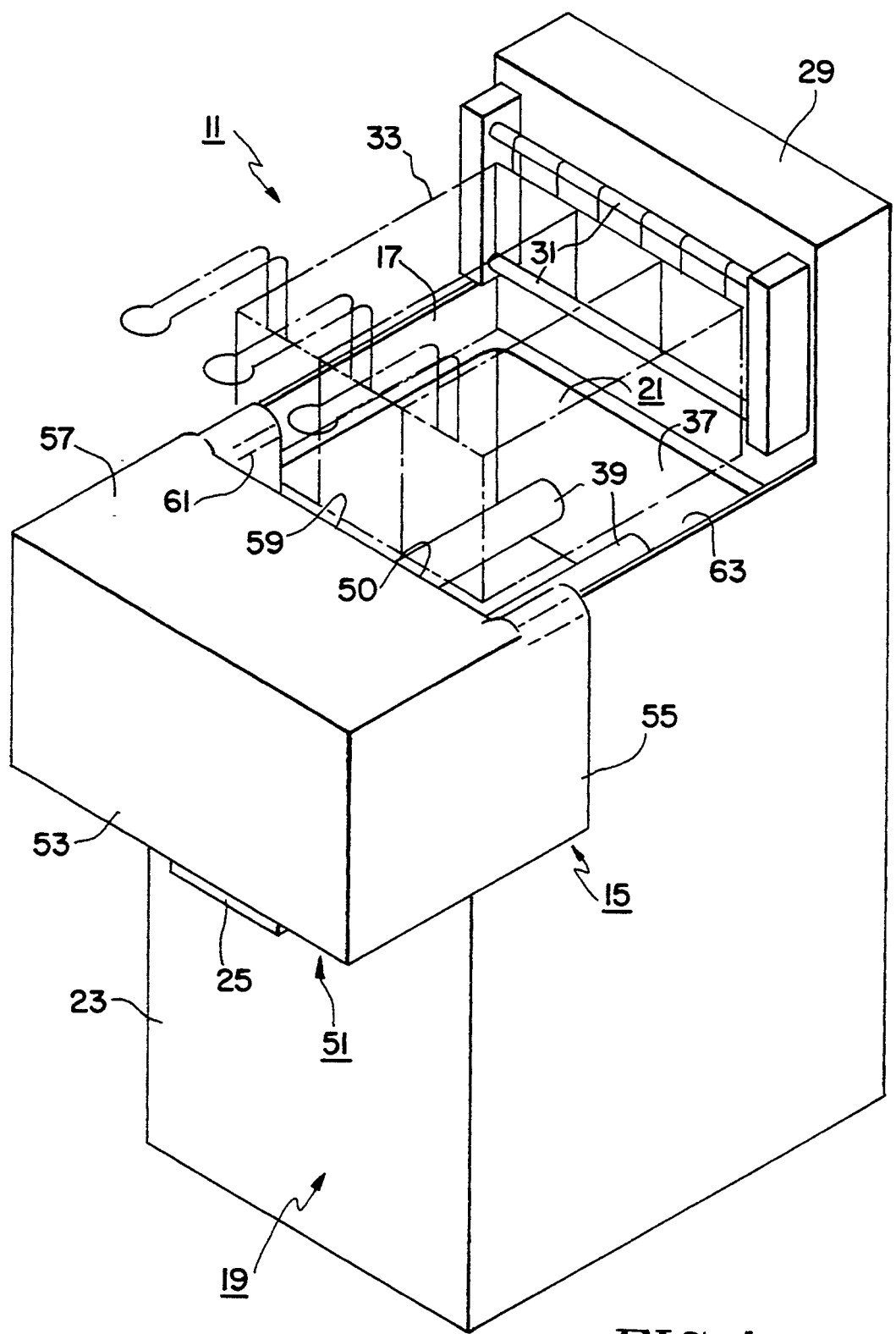
FIG. 1 is a view in isometric showing a fryer constituting an embodiment of this invention.
Figure 1A:
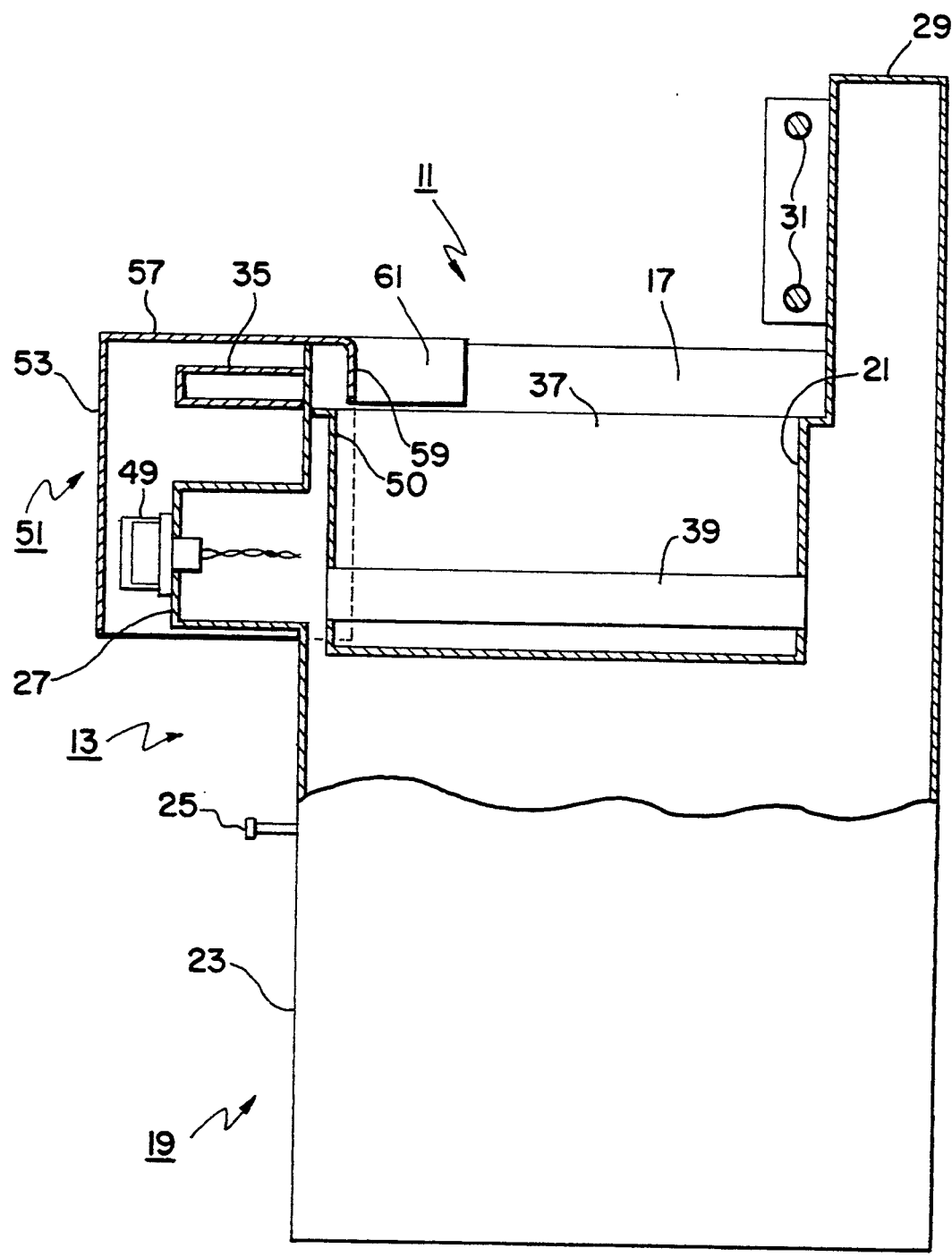
FIG. 1A is a view in section taken along line 1A—1A FIGS. 1 and 1A.
Figure 2:
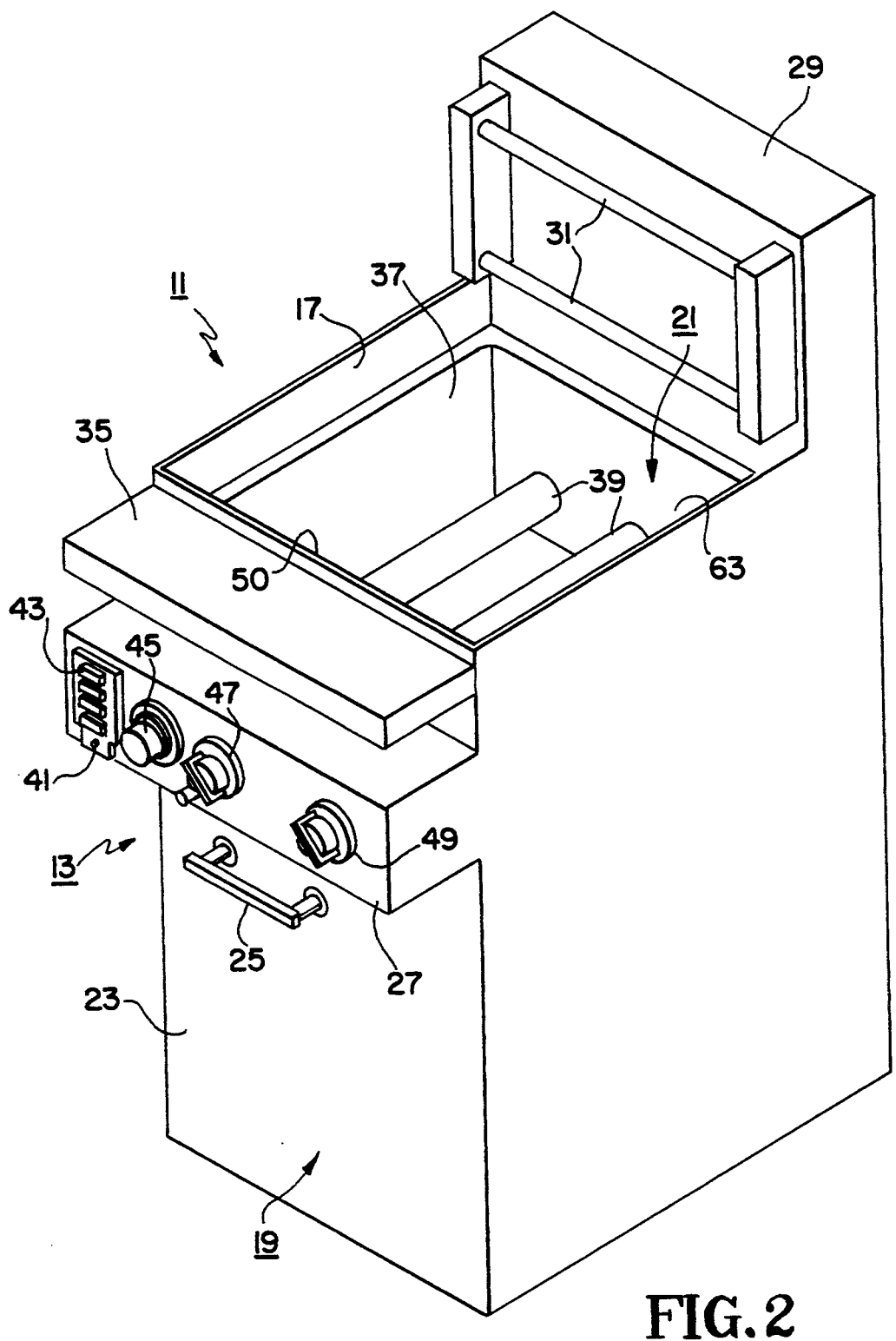
FIG. 2 is a view in isometric showing the fryer shown in FIG. 1 with the protective cover and the assembly of baskets for holding food to be fried removed.
Figure 3:
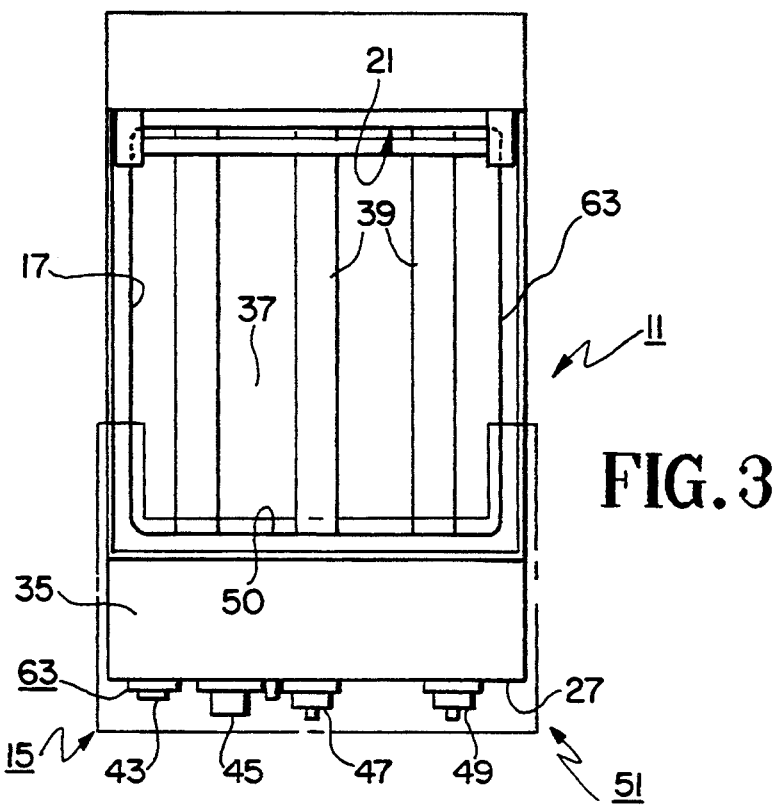
FIG. 3 is a plan view of the fryer shown in FIG. 2 with the baskets and screen removed and with the protective cover shown in dash-dot line.
Figure 4:
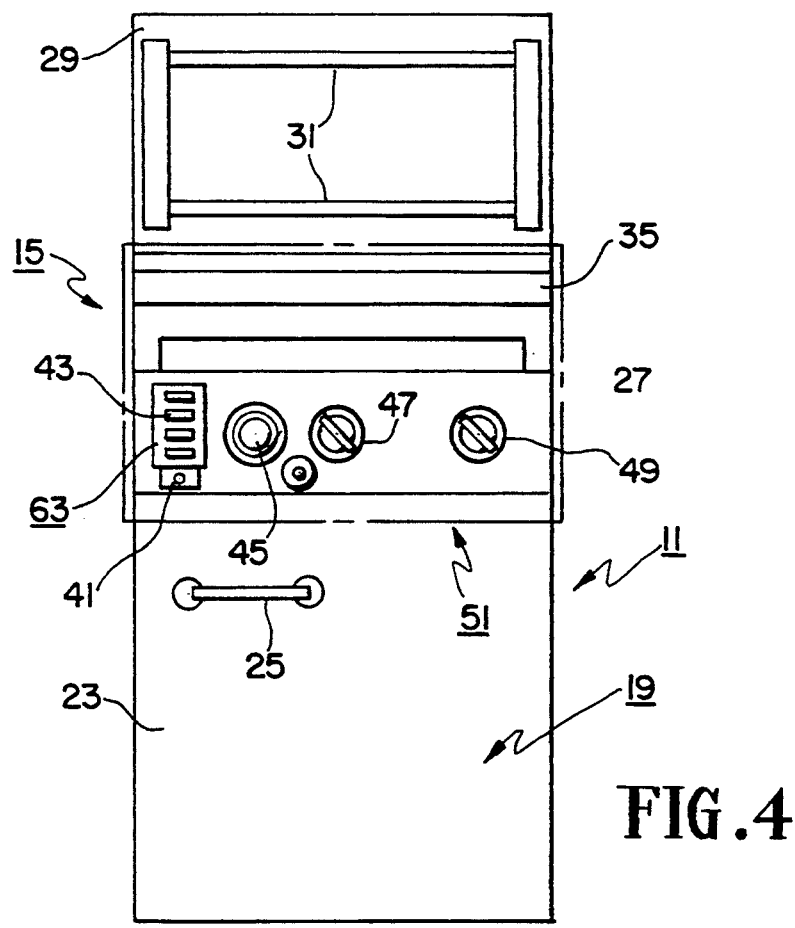
FIG. 4 is a view in front elevation of the fryer cover shown in FIG. 3.

The apparatus shown in FIGS. 1, 1A and 2 is a fryer 11 including a cabinet 13 and a protective cover 15. The cabinet 13 is defined by opposite side walls 17 (FIGS. 2, 3) extending along its length Joined by a front wall 19 (FIG. 4) and a rear wall 21. The front wall 19 is provided with a door 23 having a handle 25. Above the door, a control panel 27 is mounted. The rear wall 21 has an upward extension 29 on which is mounted a bracket having rods 31 (FIG. 2) for supporting a basket assembly including openwork baskets 33, typically for holding potato sections to be fried. A shelf 35 (FIGS. 3 and 4) extends from the front wall 19 over the control panel 27.

The walls 17, 19 and 21 define a compartment 37 which holds frying oil, typically peanut oil. A screen (not shown) extends within the compartment for holding food, typically weiners or hamburgers and French fried potatoes and onion rings to be fried. Heating tubes 39 (FIG. 3) extend across the compartment between the front and rear walls 19 and 21 to which they are sealed liquid tight. A heater (not shown) is provided in the lower part of the cabinet 13. The heater is typically a gas heater which generates a flame that penetrates into the heating tubes 39.

The control panel 27 (FIGS. 3, 4) typically has control mechanisms including a toggle switch 41 for turning the heater on and off, signal lights 43 for indicating the status of the heater, a control knob 45 for the thermostat (not shown) which controls the temperature of the heater, a high limit switch 47, and a timer control 49. These mechanisms operate electrically and are connected by wires (not shown) in the space 50 (FIG. 2) behind the front panel to components (not shown) of the heater within the cabinet 13.

In the past, prior to this invention, fryers of the general type described above have suffered from a demand for excessive maintenance. Fires have also been ignited in the space behind the control panel 27 which damaged the wiring for the controls. It has been discovered in arriving at this invention that the reason for this maintenance demand and for the fires has been the deposit of spray from the frying operations on the control mechanisms and particularly on the wires (not shown) which are connected to the terminals of the mechanisms.

Figure 5:
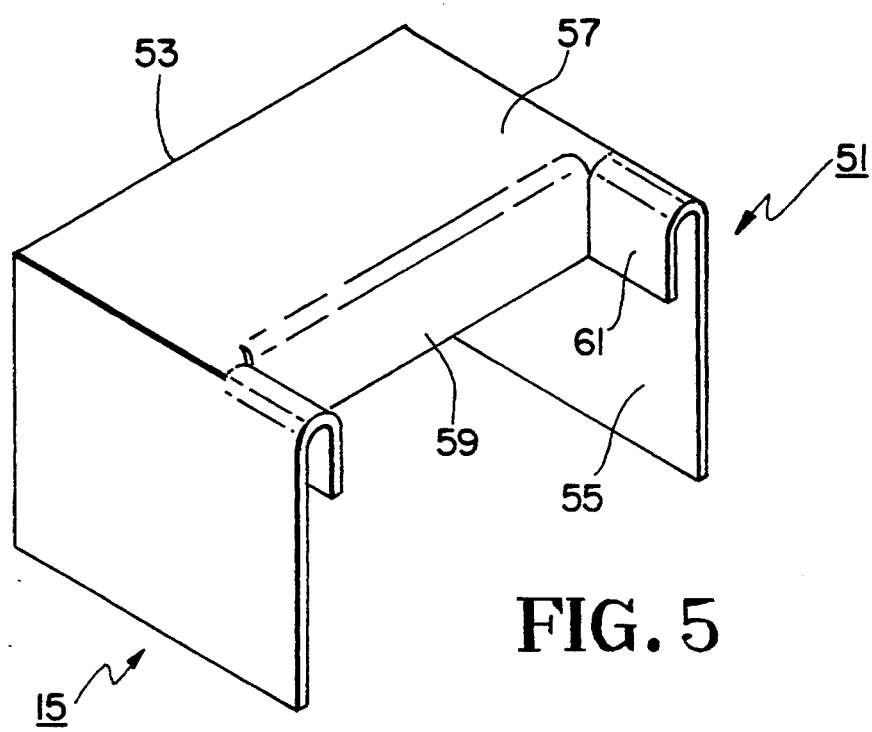
FIG. 5 is a view in isometric showing the protective cover of the fryer shown in FIG. 1 and 1A.
Figure 6:
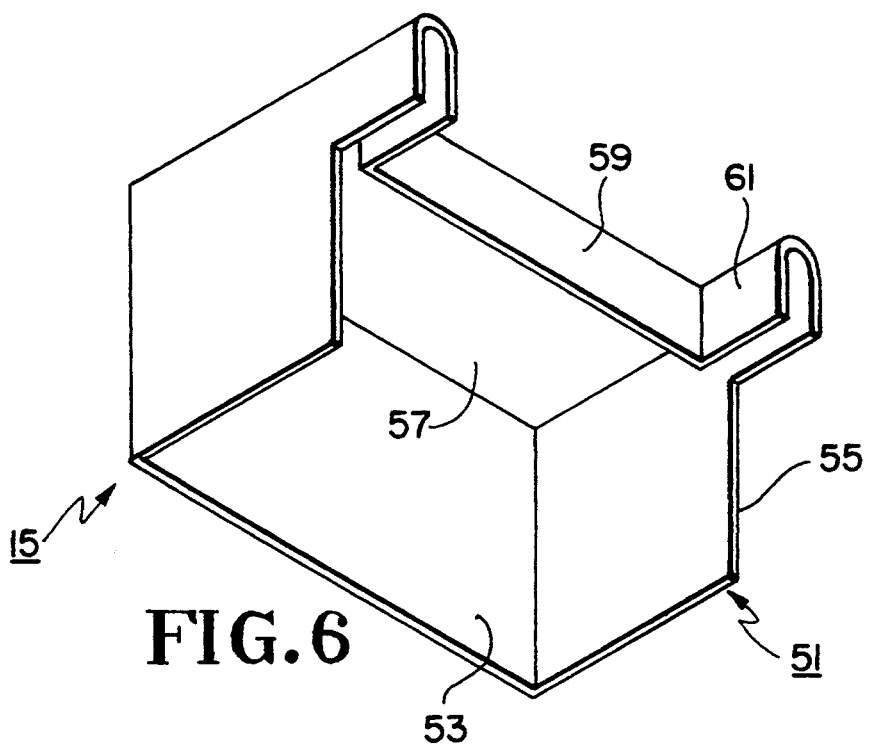
FIG. 6 is also a view in isometric showing another view of the protective cover.

The fryer 11 overcomes these disadvantages. This fryer has a portective cover 51 which prevents the deposit of spray on the control panel 27 from the front, sides and top of the panel. The protective cover 51 (FIGS. 1, 5, 6) is typically an integral structure typically composed of stainless steel including a channel whose web 53 covers the front of the panel 27 and whose flanges 55 cover the sides of the panel. A top cover 57 extends over the top of the cabinet 13 and it has a lip 59 which projects downwardly. The top cover 57 is dimensioned to envelop the shelf 35 (FIG. 3) with the lip 59 extending downwardly to effectuate the protection from spray of the control mechanisms 41, 43, 45, 47, 49 on panel 27 from the spray. The top cover 57 terminates short of the flanges 55. Beyond the front cover 57, the protective cover is provided with slots 61, The protective cover 51 is mounted over the control panel 27 by engaging the slots 61 with the upper edges 63 (FIG. 3) of the side walls 17 extending along the length of the cabinet. It may be readily removed by disengaging the edges 63 so that the control mechanisms 41, 45, 47, 49 may be manipulated to set and maintain the temperature of the fryer.

In the use of the fryer according to this invention, it has been found that the front control panel is completely protected from the spray and maintenance is materially reduced. The protective cover can be readily produced from a sheet of stainless steel by forming and stamping.

While an embodiment of this invention has been disclosed herein, many modifications thereof are feasible. This invention is not to be restricted except insofar as is necessitated by the spirit of the prior art.

I claim:

1. A fryer including a cabinet having heating means therein, a control panel on an outer wall of the cabinet, having all the manually actuable mechanisms for controlling completely the heating means mounted thereon, said mechanisms being undesirably exposed to spray from the frying operation when the fryer is in use, and a protective cover for the control panel readily mountable on, or removable from, the cabinet completely enclosing the control panel about its top and sides in protective relationship with said all manually actuable mechanisms preventing the deposit of spray on said all manually actuable mechanisms.

2. A fryer including a cabinet having a compartment for housing cooking oil, said compartment to receive therein food to be processed, said compartment being defined by opposite walls extending along the length of the compartment and terminating on upper edges and by front and back cross walls extending between said opposite walls, heating means for the oil within the compartment, manually actuable control means for the complete control of the heating means mounted on the front wall of the cabinet, said control means being undesirably exposed to spray from the heated oil within the compartment during the processing of the food, and a protective cover for preventing the spray from impinging on all the manually actuable control means, said protective cover being readily suspended from said upper edges in protective relationship with the control means and readily removable and being structured so that when so suspended it extends over the top of the control means and partially over and into the cabinet for effectuating the prevention of the deposit of spray in said all manually actuable control means.

3. The fryer of claim 2 wherein the protective cover has a housing for the upper boundary of the front walls, said housing being defined by a top of the protective cover from which an inward lip depends downwardly, the lip and top preventing spray from impinging downwardly or laterally on said upper boundary.

4. For use with a fryer including a cabinet having heating means therein, said cabinet having lateral walls extending along its length Joined by an outer crosswall, said crosswall having a control panel, containing on its outer surface, mechanisms for turning the heating means on and off and for controlling the temperature of the heating means, said mechanism being undesirably exposed to spray from said fryer when said fryer is in use; a protective cover for the panel and the exposed mechanism thereon, said protective cover having a member to extend over the surface and sides of the panel to prevent the deposit of spray on said surface, and an enclosure connected to said member to enclose the top of the front wall to prevent the deposit of spray on said top, and opposite slots extending from the enclosure to be engaged with and supported on the upper edges of said lateral walls, whereby said protective cover may be readily mounted on said fryer in protective relationship with said mechanisms or readily removed from the fryer to provide access for setting said mechanism.

5. The protective cover of claim 4 wherein the member, the enclosure and the slots constitute an integral structure.

6. The protective cover of claim 5 wherein the member is of channel structure, the web of the channel to extend over the front face of the panel and the flanges to extend over the sides of the cabinet where said sides extend from the panel; the protective cover also including a top extending generally at right angles to the web terminating in a lip extending generally at right angles to the top at a position intermediate the ends of the flanges and the slots extend from the lip to the ends of said flanges.

7. For use with a fryer having a cabinet having heating means therein and having a front panel supporting all mechanisms for controlling the heating means, said mechanisms being undesirably exposed to damage produced by spray from said fryer when said fryer is in use; a protective cover for said mechanisms for preventing deposit of spray on said all said mechanisms on said panel, said protective cover being structured to be readily mounted on said cabinet and when so mounted to cover completely said panel and said all mechanisms and to be readily removable from said cabinet, said protective cover having means to be positionally cooperative with said front panel preventing the deposit of spray from the front, sides or top of said panel.

8. The cover of claim 7 having separate means for preventing deposit of spray on the panel from the front, sides and top of the panel.

9. A fryer including a cabinet having heating means therein, a control panel on an outer wall of the cabinet, having a the manually actuable mechanisms for controlling completely the heating means mounted thereon, said mechanisms being undesirably exposed to spray from the frying operation when the fryer is in use outwardly of the cabinet, and a protective cover for the control panel readily mountable on, or removable from, the cabinet, said protective cover having walls extending outwardly of the cabinet and enveloping the top of said outer wall of the cabinet preventing the deposit of spray on said all the manually actuable mechanisms.

10. The fryer of claim 1 wherein the cabinet has front, rear and side walls and the cover includes means engagable with the top of the front wall for supporting said cover, said supporting means enveloping said top of said front wall for effectively preventing the deposit of spray on all manually actuable mechanisms from the direction of said top of said front wall.

* * * * *